United States Patent
Andersen et al.

(10) Patent No.: US 7,967,564 B1
(45) Date of Patent: Jun. 28, 2011

(54) BLADE DEFLECTION MEASUREMENT WITH MAGNETOSTRICTIVE SENSOR

(75) Inventors: Jimmi Andersen, Holstebro (DK); Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/974,240

(22) Filed: Dec. 21, 2010

(30) Foreign Application Priority Data

Dec. 22, 2009 (EP) .................... 09015863

(51) Int. Cl.
*F03D 7/00* (2006.01)
*F03D 7/02* (2006.01)

(52) U.S. Cl. ............... 416/1; 416/61; 415/118

(58) Field of Classification Search ............... 416/1, 61; 415/118; 290/44, 55
See application file for complete search history.

(56) References Cited

U.S. PATENT DOCUMENTS

| | | | |
|---|---|---|---|
| 4,297,076 A | 10/1981 | Donham et al. | |
| 4,298,313 A | 11/1981 | Hohenemser | |
| 4,922,757 A * | 5/1990 | Rozelle et al. | 416/61 |
| 7,246,991 B2 | 7/2007 | Bosche | |
| 7,322,794 B2 * | 1/2008 | LeMieux et al. | 416/40 |
| 7,638,894 B2 * | 12/2009 | Stommel | 416/1 |
| 2004/0057828 A1 | 3/2004 | Bosche | |
| 2006/0000269 A1 | 1/2006 | LeMieux et al. | |
| 2009/0068014 A1 * | 3/2009 | Enevoldsen et al. | 416/61 |
| 2009/0169357 A1 * | 7/2009 | Slack | 415/26 |
| 2009/0246020 A1 * | 10/2009 | Nielsen et al. | 416/1 |

FOREIGN PATENT DOCUMENTS

WO  WO 0133075 A1  5/2001

\* cited by examiner

*Primary Examiner* — Igor Kershteyn

(57) ABSTRACT

A measurement arrangement for measuring a deflection of a wind turbine rotor blade is provided. The measurement arrangement includes a magnetostrictive sensor, which includes a first sensor part and a second sensor part, a first support structure, which is adapted to be mounted to a first portion of the rotor, wherein the first sensor part is mounted to the first support structure, and a second support structure, which may be mounted to a second portion of the rotor, wherein the second sensor part is mounted to the second support structure and wherein either or both the first portion and the second portion is a portion of the blade. The magnetostrictive sensor measures the relative spatial position between the first sensor part and the second sensor part. A method for measuring a blade deflection and a wind turbine rotor which includes the described blade deflection measurement arrangement are also provided.

20 Claims, 3 Drawing Sheets

BLADE DEFLECTION MEASUREMENT WITH MAGNETOSTRICTIVE SENSOR

CROSS REFERENCE TO RELATED APPLICATIONS

This application claims priority of European Patent Office application No. 09015863.5 EP filed Dec. 22, 2009, which is incorporated by reference herein in its entirety.

FIELD OF INVENTION

The present invention relates to the technical field of measuring and controlling mechanical loads which are acting on a rotor blade of a wind turbine. Specifically, the present invention relates to a measurement arrangement and to a method for measuring a deflection of a blade of a rotor of a wind turbine. Further, the present invention relates to wind turbine rotor and to a wind turbine which comprise the described blade deflection measurement arrangement.

ART BACKGROUND

Rotor blades of wind turbine are exposed to large dynamic mechanical loads in particular when the wind turbine is operated in turbulent wind conditions or in conditions of flow distortion, e.g. high wind shear. Therefore, the rotor blades of wind turbines and the corresponding supporting structures have been dimensioned such as to be able to withstand all the mechanical loads that could occur under all conditions to which the wind turbine is certified. However, in case of extreme wind conditions the mechanical load acting on the rotor blades of the wind turbine must be reduced in order to avoid any damage of the wind turbine.

The risk for damaging a rotor blade strongly depends on the fatigue the blade is currently suffering and on the fatigue life time, which the rotor blade has accumulated so far during its previous operation. To be able to calculate the fatigue for instance in the root of the rotor blade, it is known to measure the deflection of the rotor blade in order to find out the current mechanical load the rotor blade is exposed to. If the rotor blade has a large deflection the fatigue load in the root is relatively big. The rotor blade deflection can be measured by means of a position sensor which is installed in the blade. With such a rotor blade sensor it is possible to individually regulate the mechanical load acting on the rotor blade for instance by pitching the respective blade. Thereby, a so called "cyclic pitching" can be applied. Another possibility for reducing high mechanical loads acting on rotor blades is to curtail the operation of the wind turbine such that less electrical power is generated. This can be realized for instance by pitching all rotor blades.

In this respect the term "cyclic pitching" refers to a method wherein the blade pitch angle setting of each rotor blade is changed during each revolution. More details about "cyclic pitching" can be found for instance in U.S. Pat. No. 4,298,313.

The current mechanical load acting on a rotor blade can be measured for instance by means of a strain gauge, which is used for measuring strains within a selected portion of a rotor blade. However, continuing load cycles of rotor blades cause a big wear of such strain gauges resulting in a reduced lifetime of the respective strain gauges. Another disadvantage of strain gauges is that they tend to drift over time and due to temperature changes. Furthermore, maintenance of strain gauges is often tedious when the respective strain sensor is located in an outer radial portion of the rotor blade. Further, when mounting a strain gauge at an outer radial rotor blade portion, for contacting the strain gauge electrical wires are necessary which run on or within the longitudinal extension of the blade and which make the rotor blade vulnerable to lighting strikes.

U.S. Pat. No. 4,297,076 discloses a wind turbine in which the tip portions of the rotor blades are variable in pitch and are cyclically varied in pitch in order to control the yaw angle of the rotor of the wind turbine and in order to relieve bending moments on the rotor blades. Further, the rotor blades are collectively varied in pitch in order to relieve bending moments on the blades and in order to maximize the power output of the turbine at a selected constant rotor speed.

U.S. Pat. No. 7,246,991 B2 discloses a wind turbine with a sensor that measures the out-of-plane deflection of the rotor blades and a controller that uses the signal from the sensor to determine the risk of a tower strike. The sensor can include strain gauges or accelerometers mounted on the rotor blades or it can include a fixed sensor mounted on the side of the tower.

There may be a need for improving deflection measurements for wind turbine rotor blades.

SUMMARY OF THE INVENTION

This need may be met by the subject matter according to the independent claims. Advantageous embodiments of the present invention are described by the dependent claims.

According to a first aspect of the invention there is provided a measurement arrangement for measuring a deflection of a blade of a rotor of a wind turbine. The described measurement arrangement comprises (a) a magnetostrictive sensor, which comprises a first sensor part and a second sensor part, (b) a first support structure, which is adapted to be mounted to a first portion of the rotor, wherein the first sensor part is mounted to the first support structure, and (c) a second support structure, which is adapted to be mounted to a second portion of the rotor. Thereby, the second sensor part is mounted to the second support structure and at least one of the first portion and the second portion is a portion of the blade. Further, the magnetostrictive sensor is capable of measuring the relative spatial position between the first sensor part and the second sensor part.

The described measurement arrangement is based on the idea that the deflection of a blade of a rotor of a wind turbine can be measured precisely by using a magnetostrictive sensor. The magnetostrictive sensor, which comprises two sensor parts, is capable of measuring the relative spatial position between the two sensor parts. Specifically, the magnetostrictive sensor may be capable of measuring the distance between the first sensor part and the second sensor part.

The described measurement arrangement is further based on the idea that in a rotor of a wind turbine the relative spatial position or the distance between different portions of the rotor respectively the blade may depend on the actual blade deflection status. Since the two sensor parts are attached to these different portions (the first sensor part is attached to the first portion, the second sensor part is attached to the second portion), by measuring this relative spatial position or distance the blade deflection can be determined.

According to the described measurement arrangement a magnetostrictive sensor is employed, which may allow for a particular precise spatial position or distance measurement.

According to an embodiment of the invention (a) the first sensor part comprises a signal transmitter, a magnetostrictive sensing element, a signal receiver and a processing device and (b) the second sensor part comprises a position determining magnet. The signal transmitter is adapted to supply a current pulse to the magnetostrictive sensing element. Thereby, the magnetostrictive sensing element and the position determining magnet are spatially arranged to each other in such a manner, that an interaction between a first magnetic field generated by the current pulse propagating within the magnetostrictive sensing element and a second magnetic field generated by the position determining magnet causes a local mechanical deformation of the magnetostrictive sensing element, which deformation propagates within the magnetostrictive sensing element. Further, the signal receiver is adapted for sensing the propagating local mechanical deformation and the processing device is adapted (i) to measure a time difference between a first time of supplying the current pulse and a second time of sensing the propagating local mechanical deformation and (ii) to determine the deflection of the blade based on the measured time difference.

It is mentioned that it is not necessary that the magnetostrictive sensing element and the position determining magnet are in mechanical contact with each other. It is only necessary that the first magnetic field generated by the propagating current pulse and the second magnetic field generated by the position determining magnet can interact with each other in such a manner, that the described local mechanical deformation is generated. After the generation of this local mechanical deformation the deformation propagates or travels within the magnetostrictive sensing element. Therefore, the magnetostrictive sensor can operate in a contactless manner, which may guarantee a long sensor lifetime.

The described determination of the distance between the signal transmitter and the signal receiver (both being assigned to the first sensor part) and the position determining magnet (being assigned to the second sensor part) by means of a time measurement may provide the advantage of a high measurement accuracy can be achieved because with modern electronic devices time durations can be measured very precisely by using high frequency electronic devices.

It is mentioned that the propagation of the local mechanical deformation can be understood as a sound wave which is travelling through the magnetostrictive sensing element. Thereby, the sound velocity depends on the material properties of the magnetostrictive sensing element. In particular the sound velocity depends on the mass density, on the module of elasticity and on the poisson's ratio. In solid matter the sound wave may be associated (a) with volumetric deformations (compressions) and/or (b) with shear deformations. The first are called longitudinal waves and the latter are called shear waves.

According to a further embodiment of the invention the magnetostrictive sensing element comprises an elongated shape. This may provide the advantage that the local mechanical deformation can propagate within a spatially restricted region along the longitudinal extension of the magnetostrictive sensing element. As a consequence the mechanical deformation can propagate only along a preferred direction towards the sensing region of the signal receiver and signal losses being based on mechanical deformations travelling in other unwanted direction can be avoided or reduced at least significantly. Further, due to a defined pathway for the propagation of the deformation interference effects caused by unwanted reflections of mechanical deformations can be avoided or kept within small limits.

It is mentioned that at least a portion of the pathway for the propagating local mechanical deformation and at least a portion of the pathway for the current pulse may overlap with each other. This means that the elongated magnetostrictive sensing element may serve as a waveguide not only for the propagation of the mechanical deformation but also for the propagation of the current pulse.

According to a further embodiment of the invention the magnetostrictive sensing element is oriented angled and in particular at least substantially perpendicular with respect to the surface of the second portion of the rotor. This may provide the advantage that the second support structure may be designed in such a manner that a deflection or a bending of the rotor blade results in a vertical shift of the location of the position determining magnet with respect to the surface of the first portion. In mathematically precise words the magnetostrictive sensing element may be orientated parallel to a normal vector of the surface of the second portion of the rotor. Further, when the blade exhibits a blade deflection the position determining magnet may move parallel to this normal vector.

According to a further embodiment of the invention the magnetostrictive sensing element comprises a ferromagnetic material.

The ferromagnetic material may be for instance iron, nickel and/or cobalt. Further, the ferromagnetic material may be any alloy of two or more of these elements. This may provide the advantage that for a particular sensor geometry and for a given strength of the current pulse the magnetostrictive effect can result in a strong local mechanical deformation.

In this respect it is mentioned that the magnetostrictive principle is based on certain magneto-mechanical properties of these ferroelectric materials. Thereby, such ferromagnetic materials placed in a magnetic field undergo some microscopic distortion of the molecular structure which causes a change of their dimensions.

According to a further embodiment of the invention the position determining magnet is a permanent magnet having the shape of a bar magnet or a ring magnet.

A bar magnet may have the advantage that the position determining magnet can be realized by a usual commercially available magnet. In the geometry of the described measurement arrangement the position determining bar magnet may be arranged next to the magnetostrictive sensing element.

A ring magnet may provide the advantage that the magnetostrictive sensing element can be surrounded by the position determining ring magnet, which allows for a particular strong second magnetic field and, as a consequence, for a strong magnetic interaction between the first and the second magnetic field. This further results in a strong mechanical deformation and, as a consequence, in a clear and unambiguous detection of the propagating local mechanical deformation when passing the signal receiver.

In this respect it is mentioned that the shape of a ring magnet can also be realized by a plurality of bar magnets, which are arranged with respect to each other in a ring shaped manner. Thereby, each bar magnet may be orientated in such a manner that its longitudinal axis, which extends between the north pole end and the south pole end of the respective bar magnet, is oriented at least approximately perpendicular to the ring plane of the ring magnet.

According to a further embodiment of the invention the local mechanical deformation is a torsional deformation of the magnetostrictive sensing element. This may provide the advantage that the signal receiver can sense the mechanical deformation in a very reliable manner. Further, even if the mechanical deformation is very strong the measurement geometry of the magnetostrictive sensor will not be changed. This may result in very reliable measurement results, which can be obtained by the magnetostrictive sensor.

In the following paragraphs (A) to (G) a descriptive explanation of the working principle of a preferred embodiment of the magnetostrictive sensor respectively of the described measurement arrangement will be given:

(A) Heart of the employed magnetostrictive sensor is the magnetostrictive sensing element. The magnetostrictive sensing element can be called a waveguide, because it serves as a conductor of a torsional ultrasonic wave to the signal receiver, which may also be denominated a pulse converter. The position determining magnet may be rigidly connected to the object of position measurement (i.e. the second portion of the rotor).

(B) During the measurement, the position determining magnet may produce a longitudinal magnetic field in the waveguide. As has already been mentioned above within the described measurement arrangement the position determining magnet and the magnetostrictive sensing element (i.e. waveguide) may not be in mechanical contact with each other. This may mean that position determining magnet and the magnetostrictive sensing element are arranged with respect to each other in a complete contactless manner. This may allow for a wear-free operation throughout a long lifetime of the measurement arrangement.

(C) For the actual blade deflection measurement, a short current pulse is sent through the waveguide by the signal transmitter (e.g. a pulse generator). As this current pulse travels through the waveguide, it carries along a first magnetic field in radial direction around the waveguide. In the area of the position determining magnet, the magnetostrictive waveguide is distorted elastically for instance by the known Wiedemann effect, which causes a twisting of the waveguide under the influence of a helical magnetic field.

(D) Due to the time curve of the current pulse, this twisting is a highly dynamic process which produces a torsion wave in the effective field of the position determining magnet. This impact torsion wave travels along the waveguide and down to its lower end, where it is completely absorbed, i.e. any interference effects on signal measurement are safely precluded. The actual detection of the torsion wave is accomplished by means of the signal receiver, which may be a special pulse converting system at the upper end of the waveguide. The signal receiver may comprise a magnetostrictive metal strip connected with the waveguide, an inductive detector coil and another, fixed permanent magnet.

(E) In the described signal receiver the torsion wave, which may have a frequency in the ultrasonic regime, may cause a permeability change of the metal strip according to the inverse magnetostrictive effect (called villary effect). The resulting change of the magnetic field of the fixed permanent magnet on the time scale induces an electric current signal in the detector coil, which is processed by appropriate sensor electronics.

(F) It is mentioned that the torsional ultrasonic wave may travel through the waveguide at constant ultrasonic speed. The position of the second rotor/blade portion can be determined accurately by a travel time measurement, whereby the exact location of the position determining magnet is a function of time between the current pulse start and the arrival of the electric reply signal. The electronic reply signal may be generated by the signal receiver when the torsional ultrasound wave is passing by.

(G) Although the displacement measurement principle described above may seem to be complicated, it provides for a couple of advantages which may be important in particular when measuring blade deflections. In particular, the physical accuracy of run-time measurements and the long-term stability of the magneto strictive sensing element may be unaffected by external influences such as for instance rotor vibrations.

According to a further embodiment of the invention the second support structure comprises (a) a pedestal being adapted to be mounted to a second portion of the rotor and (b) a supporting rod, wherein the position determining magnet is mounted to the supporting rod.

Preferably, a first end portion of the supporting rod is mounted to the pedestal and the position determining magnet is mounted to the second end portion of the supporting rod.

In a non-bended or a non-deflected state of the rotor the supporting rod may extend at least substantially parallel to the surface of the second portion. This may provide the advantage that the whole measurement arrangement can be realized within a comparatively flat design. In particular, the whole measurement arrangement can be arranged within the interior of a rotor blade. This may provide the advantage that the measurement arrangement can be easily protected against rough environmental conditions such as dust, wind, extreme sun and water (rain).

According to a further embodiment of the invention the supporting rod has a length between 30 cm and 300 cm, in particular between 60 cm and 200 cm, and preferably between 80 cm and 150 cm.

An appropriate length of the supporting rod may be chosen depending on the geometry of the blade, in particular depending on the length (i.e. the radial extension) of the blade.

According to a further aspect of the invention there is provided a rotor for a wind turbine for generating electric power. The provided rotor comprises (a) a hub, (b) at least one blade being attached to the hub and (c) at least one measurement arrangement as described above.

Also the described rotor is based on the idea that the blade deflection can be measured precisely by using a magnetostrictive sensor. The magnetostrictive sensor, which comprises two sensor parts, may be capable of measuring the distance between the first sensor part and the second sensor part.

According to an embodiment of the invention the first portion of the rotor is a portion of the hub and the second portion of the rotor is a portion of the blade. This may provide the advantage that the surface of the first portion of the rotor and the surface of the second portion of the rotor can be oriented angularly, in particular at least approximately perpendicular, with respect to each other. This may allow for realizing the measurement arrangement with from a mechanical point of view comparatively simple support structures.

According to a further aspect of the invention there is provided a wind turbine for generating electric power. The provided wind turbine comprises a rotor described above.

According to a further aspect of the invention there is provided a method for measuring a deflection of a blade of a rotor of a wind turbine, wherein the rotor comprises a first portion and a second portion. The provided method comprises (a) measuring the relative spatial position between the first portion and the second portion with a magnetostrictive sensor, which comprises a first sensor part and a second sensor part, wherein (a1) the first sensor part is mechanically connected to the first portion of the rotor by means of a first support structure, wherein (a2) the second sensor part is mechanically connected to the second portion of the rotor by means of a second support structure, and wherein (a3) at least one of the first portion and the second portion is a portion of the blade, and (b) determining the deflection of the blade based on the measured relative spatial position.

Also the described measurement method is based on the idea that the deflection of a rotor blade can be measured precisely by using a magnetostrictive sensor having two spatially different sensor parts, which are mechanically attached by means of different support structures to different portions of the rotor.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
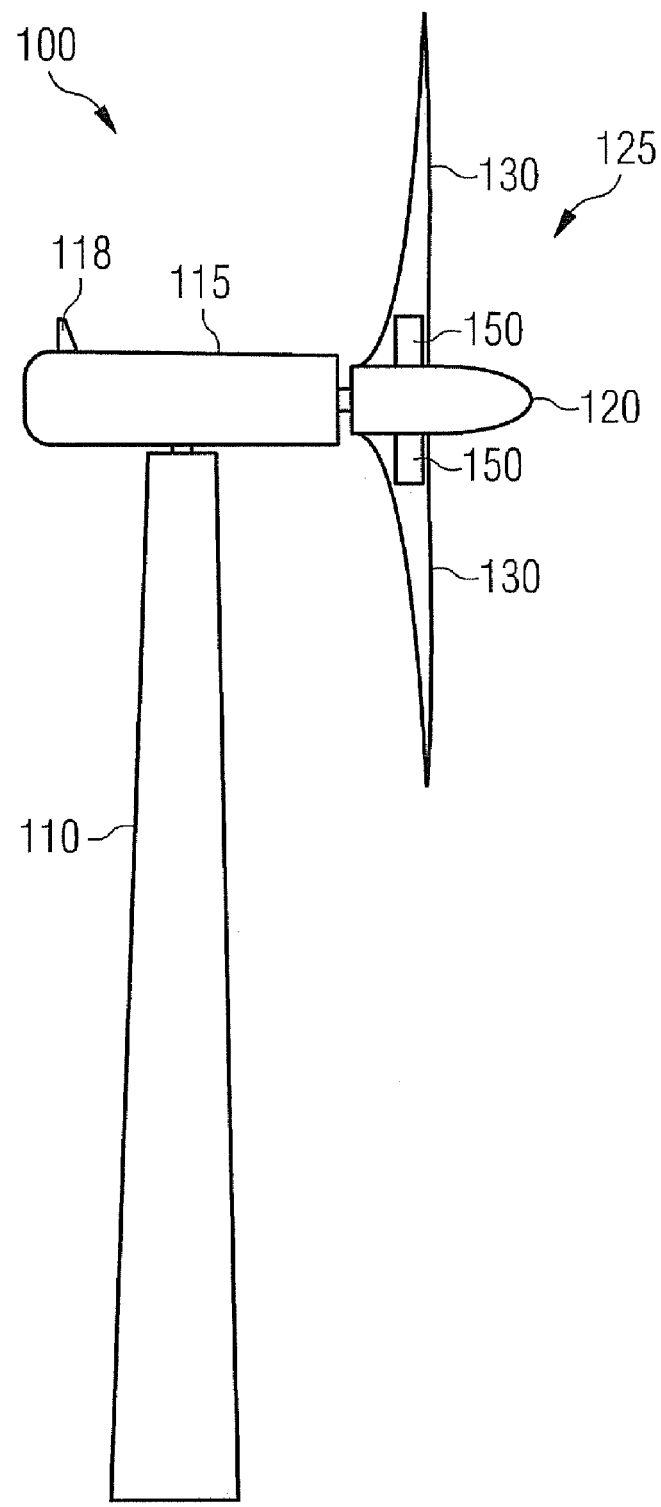
FIG. 1 shows a wind turbine having a rotor with two blades, wherein each blade is equipped with a measurement arrangement for measuring a blade deflection with a magnetostrictive sensor.

The illustration in the drawing is schematically. It is noted that in different figures, similar or identical elements are provided with the same reference signs or with reference signs, which are different from the corresponding reference signs only within the first digit.

FIG. 1 shows a wind turbine 100 comprising a tower 110 and a nacelle 115, which is mounted pivotally at a top portion of the tower 110. The nacelle is equipped with a weather station 118, which may comprise for instance a wind measurement sensor (not depicted) for determining the wind speed and the wind direction. A precise knowledge of the wind speed and/or of the wind direction may be useful for operating the wind turbine in an appropriate manner.

The wind turbine further comprises a rotor 125. According to the embodiment described here the rotor 125 comprises two blades 130, which are mounted to a hub 120 of the rotor 125. Each blade 130 is provided with a magnetostrictive measurement arrangement 150 for measuring a deflection of the respective blade 130. Such a deflection may be caused in particular by the wind which is driving the wind turbine 100.

Figure 2A:
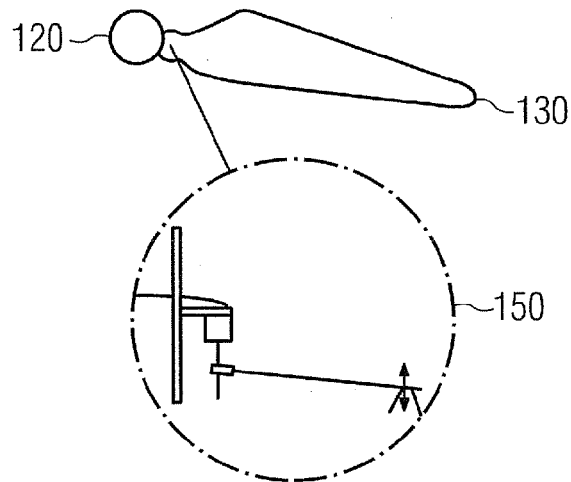
FIG. 2a shows a preferred location for the measurement arrangement within a blade portion which adjoins a rotor hub.

FIG. 2a shows a preferred location for the magnetostrictive measurement arrangement 150. According to the embodiment described here the magnetostrictive measurement arrangement 150 is located close to the hub 120 within a hollow interior of the blade 130.

Figure 2B:
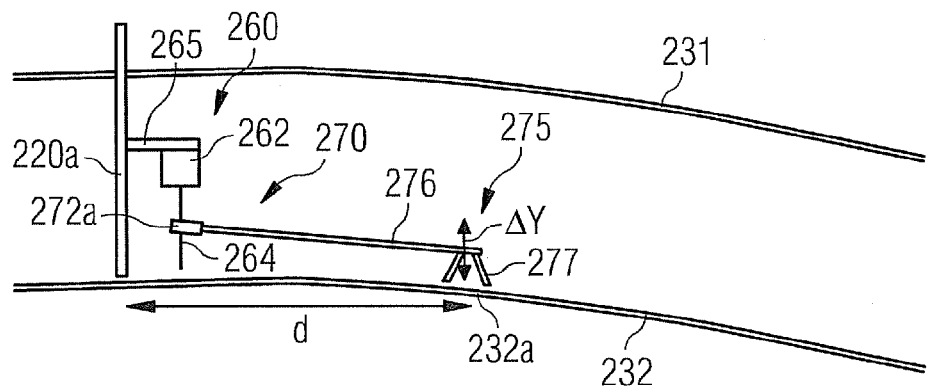
FIG. 2b shows a measurement arrangement comprising a permanent ring magnet surrounding a magnetostrictive sensing element of the magnetostrictive sensor.

FIG. 2b shows a magnetostrictive measurement arrangement according to a first embodiment of the invention. The magnetostrictive measurement arrangement is arranged within the interior of the blade 130 being defined by a front surface 231 (directed upstream with respect to the wind direction) and by a back surface 232 (directed downstream with respect to the wind direction).

The magnetostrictive measurement arrangement comprises a first sensor part 260 and a second sensor part 270. The first sensor part 260 is mounted to a first rotor portion 220a by means of a first support structure 265. According to the embodiment described here the first rotor portion is a portion 220a of the hub 120. The second sensor part 270 is mounted to a second rotor portion 232a by means of a second support structure 275. According to the embodiment described here the second rotor portion is a portion 232a of the blade 130.

As can be seen from FIG. 2b, the second support structure 275 comprises a pedestal 277 being attached to the blade portion 232a and an elongated supporting rod 276. A first end portion of the supporting rod is mounted to the pedestal 277. At the second end portion of the supporting rod 276 there is mounted a position determining magnet 272a. As can be seen from FIG. 2a a radial distance d between the hub portion 220a and the pedestal 277 is predominantly bridged by the rod 276.

According to the embodiment described here the position determining magnet 272a is a ring magnet. The function of the position determining magnet 272a will be described below in more detail.

The first sensor part 260 comprises an electronic device 262, which includes a signal transmitter and a signal receiver. The first sensor part 260 further comprises a magnetostrictive sensing element 264. As can be seen from FIG. 2a the ring magnet 272 radially surrounds the magnetostrictive sensing element 264.

As will be described below, the degree of a blade deflection is determined based on a distance measurement between the electronic device 262 (being mounted to the hub portion 220a) and the position determining magnet 272a (being mounted to blade portion 232a). A movement of the blade portion 232 for instance due to a strong driving wind along an arrow indicated with Δy will also cause a change of the position of the magnet 272a.

For measuring this distance between the electronic device 262 and the position determining magnet 272a the signal transmitter feeds a current pulse into the magnetostrictive sensing element 264, which acts as a waveguide 264 for the current pulse respective for the electromagnetic wave being associated with the current pulse. According to the embodiment described here the current pulse generates an electrical signal in a non depicted coil attached next to the waveguide. The corresponding signal provided by this coil indicates the start of a time measurement.

When the current pulse, which propagates along the waveguide 264, reaches the position of the position determining magnet 272a (a) the dynamic (electro)magnetic field of the current pulse and (b) the static magnetic field of the position determining magnet 272a interact and a local torsional deformation is generated within the waveguide 264. The local torsional deformation is reflected back to the signal receiver at least partially as an ultrasonic wave within the material of the waveguide 264.

When this reflected ultrasonic wave passes the signal receiver 262 a new electric pulse is generated, which represents the stop for the above mentioned time measurement. The time difference between start and stop, which is mainly determined by the speed of the ultrasonic wave, is indicative for the spatial distance between the electronic device 262 and the position determining magnet 272a. It is mentioned that the ultrasonic wave travels through the waveguide at a constant ultrasonic speed of around 2800 m/s.

Figure 2C:
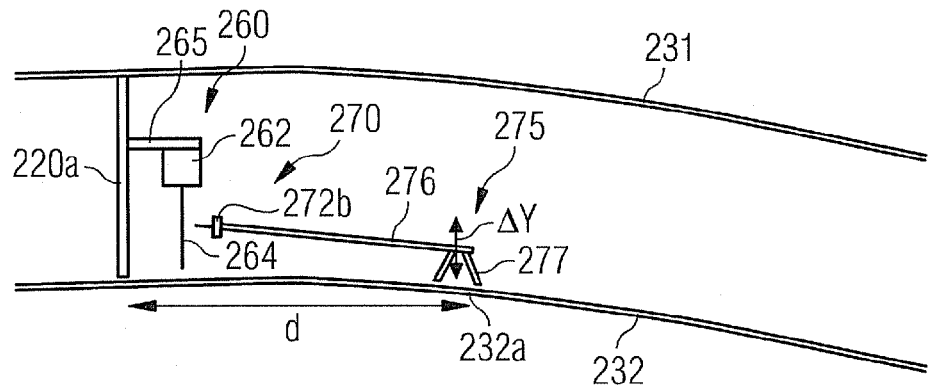
FIG. 2c shows a measurement arrangement comprising a permanent bar magnet being located next to a magnetostrictive sensing element of the magnetostrictive sensor.

FIG. 2c shows a measurement arrangement comprising a permanent bar magnet 272b being located next to a magnetostrictive sensing element 264 of the magnetostrictive sensor. Apart from the difference in the shape of the position determining magnet the components of the embodiment shown in FIG. 2c are the same or are at least similar to the corresponding components of the embodiment shown in FIG. 2b. For the sake of conciseness these same or similar components will not be described again. Instead, reference is made to the above given description of FIG. 2b.

In the embodiments shown in FIGS. 2b and 2c the magnetostrictive measurement arrangement 150 is mounted on the root of the blade 130. The position determining magnet 272a or 272b is mounted at the end of a rod 276 that is fastened on the rim of the blade 130. When the blade 130 is moving backwards and forwards along Δy (the y axis is the rotational axis of the rotor 115), the position determining magnet 272a or 272b is traveling along the magnetostrictive sensing element 264. The measureable distance from the electronic device 262 to the magnet 272a/272b is an expression for the deflection of the blade 130 in a flapwise direction.

It is mentioned that a similar magnetostrictive measurement arrangement comprising appropriate supporting elements could be installed within the blade 130, if information about an edgewise blade deflection in needed. When the blade deflection is found, an expression for the load and the wear to the blade 130 can be found.

It is further mentioned that the distance d to the mounting place on the rim of the blade 130 may be adjustable seen from a test perspective. It should be possible to place the fastening point of the pedestal 277 in different distances from the blade root (i.e. the hub portion 220a). However, when implementing the described magnetostrictive measurement arrangement for commercial use the distance d may not be adjustable. Further, a protection shield may be placed surrounding the magnetostrictive sensing element 264 and the position determining magnet 272a/272b on order to avoid damage to the magnetostrictive measurement arrangement.

Figure 3:
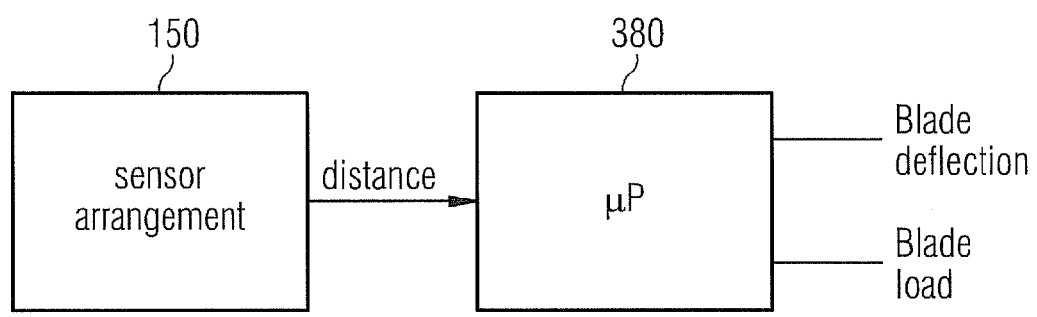
FIG. 3 shows a processing of distance data being provided by a magnetostrictive measurement arrangement into blade deflection data and blade load data.

FIG. 3 shows a processing of distance data being provided by the magnetostrictive measurement arrangement 150 into blade deflection data and blade load data. As can be seen from FIG. 3 the magnetostrictive measurement arrangement 150 transmits a signal being indicative for the measured distance to a processing device 380. In the processing device 380, which might be an appropriately programmed microprocessor, distance information is processed into several values. According to the embodiment described here a first value is the deflection of the blade in the mounting radius of the magnet. A second value is the blade load which is the specific mechanical load the blade is exposed to.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A measurement arrangement for measuring a deflection of a blade of a rotor of a wind turbine, the measurement arrangement, comprising:
   a magnetostrictive sensor which includes a first sensor part and a second sensor part;
   a first support structure which is adapted to be mounted to a first portion of the rotor; and
   a second support structure which is adapted to be mounted to a second portion of the rotor,
   wherein the first sensor part is mounted to the first support structure,
   wherein the second sensor part is mounted to the second support structure,
   wherein at least one of the first portion and the second portion is a portion of the blade, and
   wherein the magnetostrictive sensor measures a relative spatial position between the first sensor part and the second sensor part.

2. The measurement arrangement as claimed in claim 1, wherein the first sensor part includes a signal transmitter, a magnetostrictive sensing element, a signal receiver, and a processing device,
   wherein the second sensor part includes a position determining magnet,
   wherein the signal transmitter supplies a current pulse to the magnetostrictive sensing element,
   wherein the magnetostrictive sensing element and the position determining magnet are spatially arranged to each other in such a manner, that an interaction between a first magnetic field generated by the current pulse propagating within the magnetostrictive sensing element and a second magnetic field generated by the position determining magnet causes a local mechanical deformation of the magnetostrictive sensing element, whereby the local mechanical deformation propagates within the magnetostrictive sensing element,
   wherein the signal receiver is adapted for sensing the propagating local mechanical deformation, and
   wherein the processing device is adapted to measure a time difference between a first time of supplying the current pulse and a second time of sensing the propagating local mechanical deformation and to determine a deflection of the blade based on the measured time difference.

3. The measurement arrangement as claimed in claim 2, wherein the magnetostrictive sensing element includes an elongated shape.

4. The measurement arrangement as claimed in claim 3, wherein the magnetostrictive sensing element is oriented angled.

5. The measurement arrangement as claimed in claim 4, wherein the magnetostrictive sensing element is at least substantially perpendicular with respect to a surface of the second portion of the rotor.

6. The measurement arrangement as claimed in claim 2, wherein the magnetostrictive sensing element includes a ferromagnetic material.

7. The measurement arrangement as claimed in claim 2, wherein the position determining magnet is a permanent magnet including a shape of a bar magnet.

8. The measurement arrangement as claimed in claim 2, wherein the position determining magnet is a ring magnet.

9. The measurement arrangement as claimed in claim 2, wherein the local mechanical deformation is a torsional deformation of the magnetostrictive sensing element.

10. The measurement arrangement as claimed in claim 2, wherein the second support structure comprises:
- a pedestal adapted to be mounted to the second portion of the rotor, and
- a supporting rod, wherein the position determining magnet is mounted to the supporting rod.

11. The measurement arrangement as claimed in claim 2, wherein the supporting rod includes a length between 30 cm and 300 cm.

12. The measurement arrangement as claimed in claim 11, wherein the supporting rod includes the length between 60 cm and 200 cm.

13. The measurement arrangement as claimed in claim 12, wherein the supporting rod includes the length between 80 cm and 150 cm.

14. A rotor for a wind turbine that generates electric power, the rotor comprising:
- a hub;
- a blade attached to the hub;
- a measurement arrangement, comprising:
  - a magnetostrictive sensor which includes a first sensor part and a second sensor part,
  - a first support structure which is adapted to be mounted to a first portion of the rotor, and
  - a second support structure which is adapted to be mounted to a second portion of the rotor,
- wherein the first sensor part is mounted to the first support structure,
- wherein the second sensor part is mounted to the second support structure,
- wherein at least one of the first portion and the second portion is a portion of the blade, and
- wherein the magnetostrictive sensor measures a relative spatial position between the first sensor part and the second sensor part.

15. The rotor as claimed in claim 14, wherein
the first portion of the rotor is a first portion of the hub, and
the second portion of the rotor is a second portion of the blade.

16. The rotor as claimed in claim 14,
wherein the first sensor part includes a signal transmitter, a magnetostrictive sensing element, a signal receiver, and a processing device,
wherein the second sensor part includes a position determining magnet,
wherein the signal transmitter supplies a current pulse to the magnetostrictive sensing element,
wherein the magnetostrictive sensing element and the position determining magnet are spatially arranged to each other in such a manner, that an interaction between a first magnetic field generated by the current pulse propagating within the magnetostrictive sensing element and a second magnetic field generated by the position determining magnet causes a local mechanical deformation of the magnetostrictive sensing element, whereby the local mechanical deformation propagates within the magnetostrictive sensing element,
wherein the signal receiver is adapted for sensing the propagating local mechanical deformation, and
wherein the processing device is adapted to measure a time difference between a first time of supplying the current pulse and a second time of sensing the propagating local mechanical deformation and to determine a deflection of the blade based on the measured time difference.

17. The rotor as claimed in claim 16, wherein the magnetostrictive sensing element includes an elongated shape.

18. The rotor as claimed in claim 17, wherein the magnetostrictive sensing element is oriented angled.

19. The rotor as claimed in claim 18, wherein the magnetostrictive sensing element is at least substantially perpendicular with respect to a surface of the second portion of the rotor.

20. A method for measuring a deflection of a blade of a rotor of a wind turbine, the method comprising:
- measuring a relative spatial position between a first portion of the rotor and second portion of the rotor with a magnetostrictive sensor, which comprises a first sensor part and a second sensor part, wherein the first sensor part is mechanically connected to the first portion using a first support structure, wherein the second sensor part is mechanically connected to the second portion using a second support structure, and wherein at least one of the first portion and the second portion is a portion of the blade, and
- determining a deflection of the blade based on the measured relative spatial position.

* * * * *